July 10, 1962  G. V. ZITO ETAL  3,044,012
ION AIR DENSITY SENSOR AND ALTITUDE INDICATOR CONTROL SYSTEM
Filed March 21, 1960  3 Sheets-Sheet 1

ALTITUDE INDICATOR

INVENTORS
GEORGE V. ZITO
EDWARD A. CHILTON
BY Herbert L. Davis
ATTORNEY

INVENTORS
*GEORGE V. ZITO
EDWARD A. CHILTON*
BY *Herbert L. Davis*
ATTORNEY

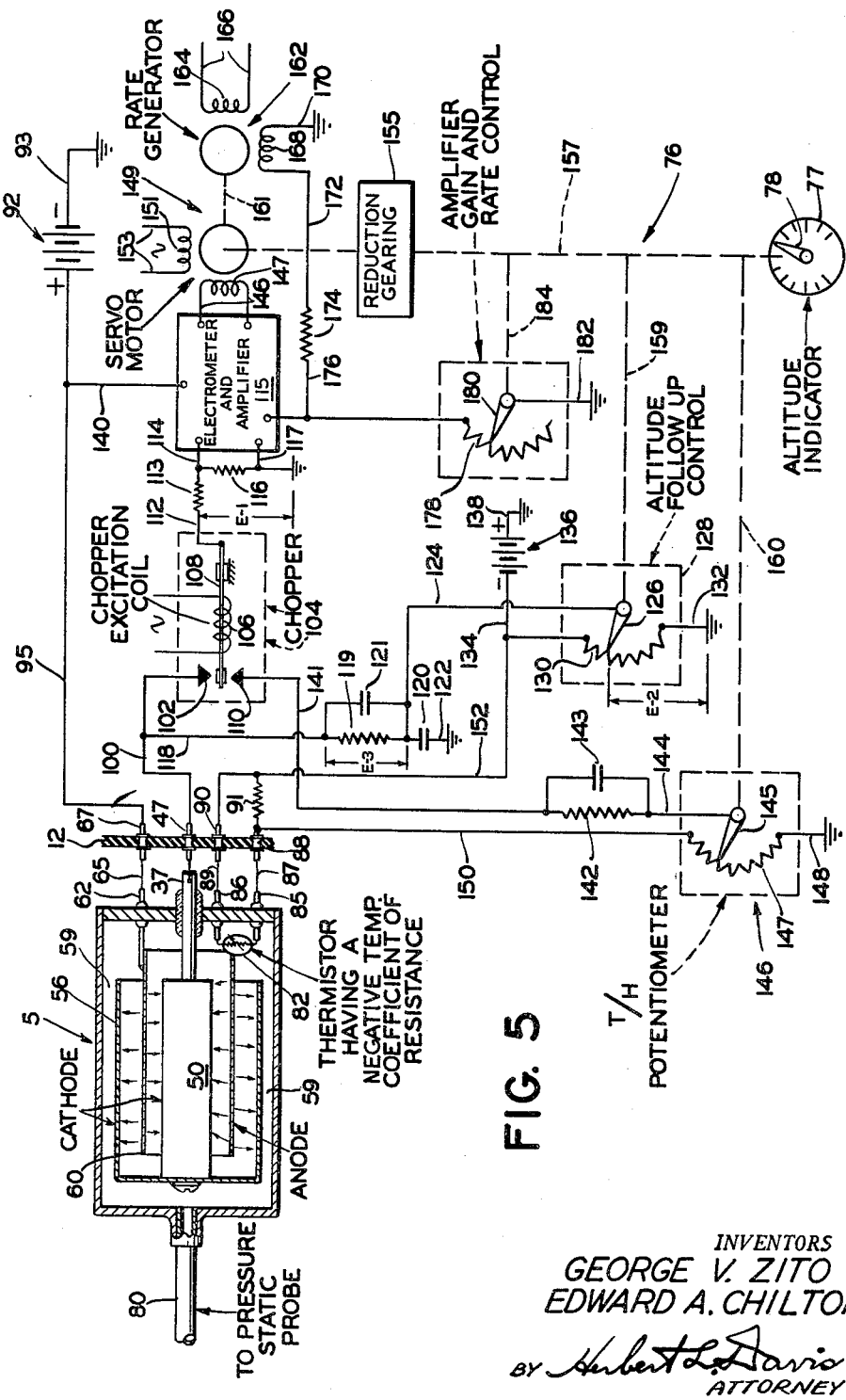

United States Patent Office 3,044,012
Patented July 10, 1962

3,044,012
ION AIR DENSITY SENSOR AND ALTITUDE
INDICATOR CONTROL SYSTEM
George V. Zito, Northvale, and Edward A. Chilton, Jersey City, N.J., assignors to The Bendix Corporation, a corporation of Delaware
Filed Mar. 21, 1960, Ser. No. 16,358
16 Claims. (Cl. 324—33)

This invention relates to improvements in an ion air density sensor and altitude indicator control system operative thereby of a type such as disclosed and claimed in copending U.S. application Serial No. 693,323 filed October 30, 1957 by George V. Zito and in U.S. application Serial No. 15,449 filed March 16, 1960, by Joseph Steenfeld and George V. Zito, and both assigned to Bendix Aviation Corporation, now by change of name The Bendix Corporation, assignee of the present invention.

More particularly the present invention relates to a novel control system for an altitude indicator and to an improved ion air density sensor including novel means for compensating the control system for variations in the temperature of the sampled air subject to ionization.

An object of the invention is to provide a novel altitude indicator control system including a novel chopper arrangement for effecting a control signal in the system and novel means for correcting the signal so as to compensate the control system for variations in the sampled air temperature incident to initial warm up of a sensor oven or due to transient conditions effecting the temperature of the sampled atmospheric air subject to ionization within the sensor or the regulated temperature of the oven.

Another object of the invention is to provide a novel means for sensing the temperature of the sampled atmospheric air within an ion air density sensor including a thermistor element of a suitable carbon alloy having a negative temperature coefficient of resistance and operatively connected in the altitude indicator control system so as to compensate the system for variations in the effective temperature of the sampled atmospheric air from that predetermined value normally maintained by the oven.

Another object of the invention is to provide a novel ion air density sensor for supplying a control signal to an altitude indicator and including an oven for normally maintaining the temperature of the sampled atmospheric air in the sensor at a predetermined constant value, together with a novel temperature responsive means sensitive to the temperature of the sampled atmospheric air within the sensor for correcting the control signal so as to compensate for variations in the temperature of the sampled air from said predetermined value and which variations in temperature might otherwise cause an inaccuracy in the indicated altitude.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose. In the drawings:

FIGURE 5 is a schematic electrical wiring diagram of the altitude indicator control system.

Figure 1:
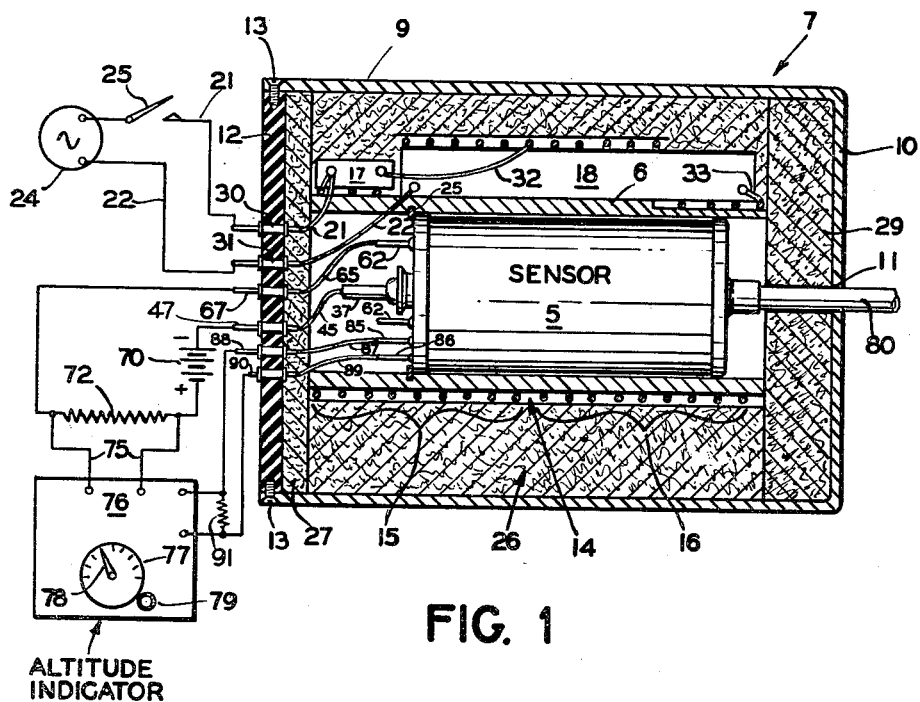
FIGURE 1 is a schematic showing of the sensor and oven in assembled relation.

Referring to the drawing of FIGURE 1, there is indicated generally by the numeral 5 an air density sensor device positioned within a tubular member 6 of copper or other good heat conducting material. The member 6 is in turn positioned within an oven 7 including a casing 9 having at one end a plate 10 with an aperture 11 therein and at the opposite end a panel of a suitable electrical insulation material removably fastened therein by bolts 13. These is further provided a heater assembly including heater coils 15 and 16 wound on the tubular member 6 and surrounding the sensor device 5.

The heater coils 15 and 16 are controlled by a coarse thermostatic switch 17 and a highly sensitive thermostatic switch 18 mounted on the tubular member 6, as shown in FIGURE 1. The thermostatic switches 17 and 18 may be of a conventional bimetal type each carried within a suitable casing and arranged to control the energizing circuit for heater coils 15 and 16, as shown diagrammatically by FIGURE 2, so as to maintain the temperature within the oven 7 at a substantially constant predetermined value of for example 100° C. within ± .1° C. so that the temperature of the sampled air within the sensor 5 may be maintained at the predetermined constant value so as to effect, as hereinafter explained, a sensor output current directly proportional to the atmospheric pressure at the prevailing altitude level.

Figure 2:
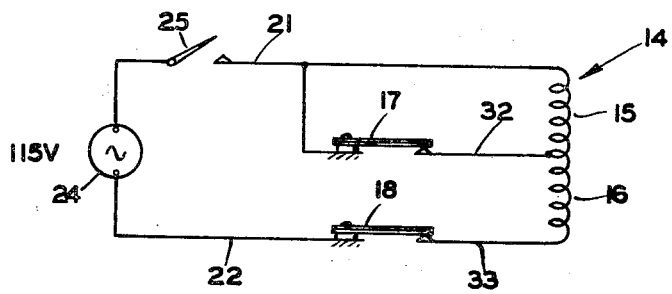
FIGURE 2 is a schematic wiring diagram of the heater coils and thermostatic controls for the oven.

In the arrangement, as shown in FIGURE 2, both the bimetalic thermostatic switch 17 and the bimetalic thermostatic switch 18 are initially closed so that upon the operator connecting conductors 21 and 22 across a suitable source of electrical energy 24 by closing a main control switch 25 the thermostatic switch 17 initially shunts the heater coil 15 so that the full energizing current is applied through the switch 17 and switch 18 to the coil 16. The energized heater coil 16 then rapidly increases the temperature within the oven 7 until the temperature approaches within a predetermined range of the desired temperature whereupon the switch 17 opens effecting energization of both the heater coil 15 together with heater coil 16 until as the desired temperature is reached the highly sensitive thermostatic switch 18 opens and thereafter regulates the temperature within the oven 7 to the desired value by closing and opening the energizing circuit to the heater coils 15 and 16 as the regulated temperature value drops below and increases to the desired value.

As shown in FIGURE 1, the sensor device 5 is slidably mounted within the tubular member 6 so as to fit against a retaining ring 25 carried within the tubular member 6. Surrounding the sensor device 5 and tubular member 6 is the heater assembly 14 which in turn has wrapped around the assembly a blanket 26 of a suitable heat insulation fiberglass material which is packed into the space between the inner surface of the casing 9 and the tubular member 6. Further packed between the inner surface of the panel 12 and an end of the tubular member 6 is a pad 27 of such heat insulation fiberglass material while packed between the opposite end of the tubular member 6 and the inner surface of the end plate 10 is another pad 29 of the fiberglass material so that the heater assembly 14, tubular member 6 and sensor device 5 are supported by the fiberglass heat insulation wrapping 26 and pads 27 and 29 within the oven 7 and maintained therein under the predetermined regulated temperature or for example 100° C. within ±.1° C.

As shown in FIGURE 1, the electrical conductor 21 leads from the heater coil 15 and coarse thermostatic switch 17 through the fiberglass pad 27 to a terminal 30 mounted in the insulation panel 12 while the electrical conductor 22 leads from the highly sensitive thermostatic switch 18 controlling the heater coil 16 through the fiberglass pad 27 to a terminal 31 mounted in the panel 12. A conductor 32 leads from a center tap between heater coils 15 and 16 while a conductor 33 leads from an end of heater coil 16 to the switch 18. The conductor 32 leads from the center tap to switch 17.

Figure 3:
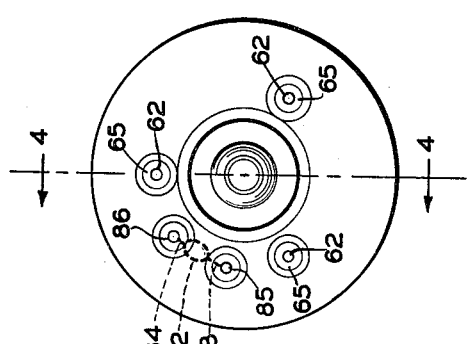
FIGURE 3 is an end view of the sensor.

The ion air density sensor 5, as shown in detail in FIGURE 3, includes a cylindrical casing 34 of a suitable heat conducting material such as copper having soldered thereto copper end plates 35 and 36.

A steel or Kovar rod 37 is concentrically mounted in the end plate 35 by a glass or porcelain electrical insulator member 39 sealed hermetically to member 41 which is engaged at 42 in a portion 43 of the end plate 35. The rod 37 is connected at one end to an electrical conductor 45 extending through the fiberglass pad 27 to an electrical terminal 47 mounted in the panel 12 of the oven 7. The opposite end of the bar 37 extends into the cylindrical casing 32 and has secured thereto a hollow tubular member 50 having a low thermal mass. The bar 37 has affixed thereto a portion 51 which provides an end support for the tubular member 50 to which the member 50 is fastened at 52. In the opposite end of the member 50 there is provided a second end portion 53 which may be soldered therein at 54.

There is further provided a cup-shaped cylindrical member 56 having a closed end portion 57 secured concentrically to the end portion 53 by a bolt 58 soldered to portion 57, and positioned within the cylindrical casing 34 in spaced relation to the casing 34 and the tubular member 50 so as to provide a space or air passageway 59 between the member 56 and the end plate 36 and casing 34.

Furthermore the outer surface of the member 50 and an inner surface of the member 56 may be nickel polished and rhodium plated so as to provide an electrode element comprising the two concentric cylinders 50 and 56 which completely enshrouds a radioactive cylindrical member 60 which serves as a second electrode element for the sensor 5.

The member 60 is positioned in spaced relation intermediate the concentric cylinders 50 and 56 and is affixed at one end to three steel or Kovar supporting pins 62 mounted in the end plate 35 by glass or porcelain insulation members 66 through which the supporting pins 62 extend to the exterior of the sensor 5. An electrical conductor 65 leads from an outer end of one of the supporting pins 62 and passes through the fiberglass pad 27 to an electrical terminal 67 mounted in the panel 12 of the oven 7.

The cylindrical member 60 may be formed of silver impregnated at the inner and outer surfaces of the member 60 with radium chloride and then rhodium plated to trap the radon produced as a consequence of radioactive decay and so as to provide an ionizing source so arranged that Alpha particles emitted by the radioactive material bombard the air molecules of the sampled air within the space between the member 60 and the inner surface of the cylindrical member 56 and the outer surface of the tubular member 50 to produce positive and negative ions.

As shown in FIGURE 1, the members 50 and 56 are connected through terminal 47 to a negative terminal of a source of electrical energy or biasing voltage such as a battery 70 so as to form a cathode element of the sensor 5, while the positive terminal of the battery 70 may be connected through a resistor 72 to the terminal 67 leading to the member 60 so that the member 60 forms an anode element of the sensor 5. Output lines 75 leads from across the resistor 72 to provide an output signal voltage directly proportional to the density, or with temperature stabilization to the pressure of the sampled atmospheric air so as to control an altitude indicator electrical control mechanism 76 which may be of a type such as explained in the aforesaid U.S. application Serial No. 693,323 or of a type such as shown in FIGURE 5 and explained hereinafter.

The mechanism 76 may include a dial 77 having indicia thereon cooperating with an indicator pointer 78 adjustably positioned by a servomotor in the mechanism 76 to indicate the prevailing altitude. The dial 77 may be initially adjusted relative to the indicator pointer 78 by suitable means such as a manually operable knob 79 drivingly connected to the dial 77 in a manner well known in the altimeter art. Thus the indicia on the dial 77 may be initially set so as to correct for variations in the barometric pressure or air density from the standard condition at a given altitude level of for example sea level and after which correction the pointer 78 may coincide with the correct indicia at the given altitude level, while at other altitude levels the indicator pointer 78 will be adjusted through the mechanism 76 so as to coincide with such initially adjusted indicia to indicate the altitude level under the then prevailing barometric pressure and air density condition.

In the sensor 5, the positive ions produced upon ionization of the sampled air are attracted to the negative electrode or cathode members 50 and 56 owing to the electrostatic field within the chamber of the sensor 5 produced by the battery 70 while the negative ions or electrons migrate toward the positive electrode or anode member 60 and through the resistor 72 to the positive terminal of the battery 70. There is thus an electron flow from the negative terminal of the battery 70 through the sensor 5 and resistor 72 (proportional to the density or pressure of the air sampled at the sensor 5) and to the positive terminal of the battery 70 to complete the electrical circuit. The Alpha particles provide a very constant source of ionization potential, and thus the control current flow obtained is a function of the molecular density of the gas filling the space between the cathode members 50 and 56 and the anode member 60.

Thus, as the density of the sampled air increases the output control current across the resistance 72 increases while as the density of the sampled air decreases the output control current across the resistance 72 decreases because of the variation in the total number of gas molecules ionized in the sampled air.

Opening into the casing 34 at a point concentric with the end portion 57 of the cylindrical cup-shaped member 56 is an air inlet conduit or tube 80 extending through the aperture 11 and leading from a static pressure probe, such as a Pitot static probe of conventional type mounted on an aircraft. The tubing 80 has a minimum length and a diameter sufficiently large so as to minimize pneumatic time lags due to air flow where pressure is changing rapidly.

The arrangement is such that air under the prevailing atmospheric pressure at the level of flight of the aircraft on entering at the adit or air inlet tube 80 is baffled by the end portion 57 of the cup-shaped anode member 56 so that it must pass through the passageway 59 formed between the casing 34 and the member 56 so as to be brought into a close thermal equilibrium with the casing 34, before entering the system of concentric cylinders and passing in turn between the anode member 60 and cathode member 56 and the anode member 60 and the cathode member 50 where the sampled air is subjected to ionizing radiation. The sensor 5 is thus "dead-ended" so as to in effect breath the atmosphere to be measured upon changes in the effective pressure thereof rather than being subjected to appreciable air flow.

Thus, upon an increase in the prevailing atmospheric pressure as upon a decrease in the altitude of the aircraft the sampled air under such increase in pressure tends to move under compression within passageway 59 along the inner surface of the casing 34 before being subject to ionization while upon a decrease in the prevailing atmospheric pressure as upon an increase in the altitude of the aircraft, the sampled air within the sensor 5 upon such decrease in the atmospheric pressure applied thereto tends to move within the passageway 59 upon decompression and out the conduit 80 so as to equalize the pressure of the sampled air within the sensor device 5 with that of the atmospheric pressure prevailing at the level of flight of the aircraft.

The foregoing structure is described in greater detail and claimed in the copending U.S. application Serial No. 15,449 filed March 16, 1960 by Joseph Steenfeld and George V. Zito. The present invention relates to improvements in the ion air density sensor and altitude indicator control system, as explained hereinafter.

*Improved Ion Air Density Sensor*

Figure 4:
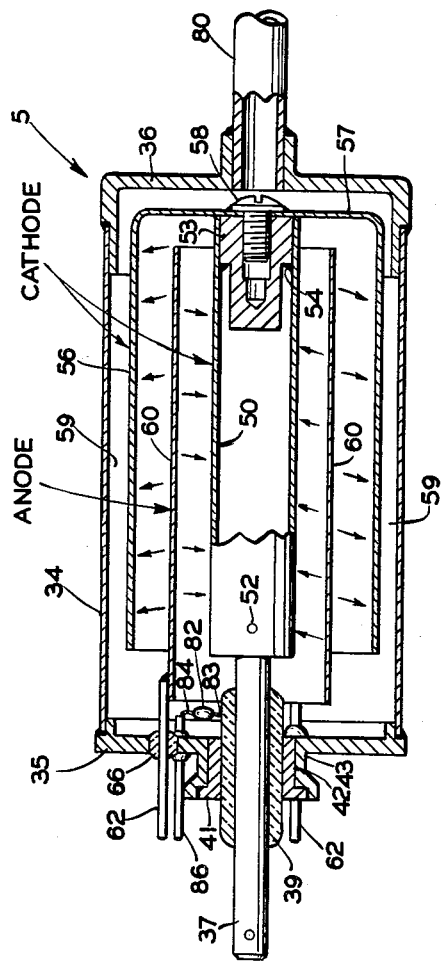
FIGURE 4 is a sectional view of the sensor taken along the lines 4—4 of FIGURE 3 and looking in the direction of the arrows.

As shown in FIGURES 3, 4 and 5, there is provided in the ion air density sensor 5 a novel temperature responsive means for sensing the temperature of the sampled atmospheric air within the sensor 5, including a thermistor bead 82 supported by electrical conductors 83 and 84 soldered to the inner ends of two steel or Kovar supporting pins 85 and 86 mounted in the end plate 35 by glass or porcelain insulation members through which the supporting pins 85 and 86 extend from the interior to the exterior of the sensor 5. As shown in FIGURES 1 and 5, an electrical conductor 87 leads from an outer end of the supporting pin 85 and passes through the fiberglass pad 27 to an electrical terminal 88 mounted in the panel 12 of the oven 7 while a second electrical conductor 89 leads from an outer end of the other supporting pin 86 and through the fiberglass pad 27 to an electrical terminal 90 mounted in the panel 12.

Connected across the terminals 88 and 90 of the thermistor bead 82 is a resistor element 91. The thermistor bead 82 may be an element formed of a suitable carbon alloy and having a negative temperature coefficient of resistance while resistor element 91 has a low temperature coefficient of resistance and serves to calibrate the thermistor bead 82 connected in the temperature compensating circuit of the improved control system, as shown in FIGURE 5 and explained in greater detail hereinafter.

*Improved Altitude Indicator Control System*

In the improved control system shown in FIGURE 5, a source of electrical energy such as a battery 92 has a negative terminal connected through a conductor 93 to a common electrical ground and a positive terminal connected by a conductor 95 to the anode element 60 of the sensor 5 through pin 62 while the cathode elements 50 and 56 are connected through rod 37 to a conductor 100. A D.C. output voltage, as hereinafter explained, may be applied through the conductor 100 to a contact element 102 of a preamplifier chopper 104 where it is chopped and converted to a suitable pulsating control signal.

The chopper 104 is of a conventional type and is shown herein schematically as including an excitation coil 106 connected across a suitable source of alternating current and arranged to actuate the switch reed element 108 so as to alternately open and close one or the other of a pair of contact elements 102 and 110 in synchronism with the alternating excitation current. The reed switch element 108 is in turn connected by an electrical conductor 112 through a resistor 113 and a conductor 114 to an input terminal of an electrometer and amplifier 115 which may be of a conventional type. A second resistor 116 leads from the conductor 114 to the common ground. The common ground is also connected by a conductor 117 to the other input terminal of the electrometer and amplifier 115.

The conductor 100 leading to the contact element 102 is connected by a conductor 118 to one end of a resistor element 119 having an opposite end connected to one plate of a capacitor 120, the opposite plate of which is connected to the common ground through a conductor 122.

Connected across the resistor element 119 is a capacitor 121 and leading from the opposite end of the resistor 119 is a conductor 124 which is connected to a movable arm 126 of an altitude follow-up control potentiometer 128. The potentiometer arm 126 cooperates with a variable resistor element 130 having one end thereof connected by a conductor 132 to the common ground and the opposite end connected by a conductor 134 to the negative terminal of a source of electrical energy such as a battery 136 having its positive terminal connected by a conductor 138 to the common ground.

The arrangement is such that the electrical energy applied by the battery 92 through the sensor 5 and across the resistor elements 119 and 130 is opposed by the electrical energy of opposite polarity applied by the battery 136 across the resistor element 130. The battery 92 has the negative terminal thereof connected to the common ground while the battery 136 has the positive terminal thereof connected to the common ground, as shown in FIGURE 5. Thus the output voltage applied through conductor 100 to the contact element 102 of the chopper 104 is the resultant difference between the opposing voltages applied across the resistor elements 119 and 130 and in turn through the chopper 104 to the electrometer and amplifier input conductors 114 and 117. As shown in FIGURE 5, the battery 92 also provides a biasing voltage to the electrometer and amplifier 115 applied through a conductor 140 leading from the conductor 95 to the amplifier 115.

In the aforenoted arrangement, upon the reed switch element 108 closing contact element 102, the atmospheric pressure signal applied by sensor 5 across the resistor element 119 and 130 is opposed by the follow-up signal applied by the battery 136 through the follow-up potentiometer 128, and any difference in the voltages is applied across the input lines 114 and 117 of the electrometer and amplifier 115.

However, upon the reed switch element 108 alternately closing the contact element 110, the input line 114 is connected through an electrical conductor 141 leading from the contact element 110 to one end of a resistor element 142. Connected across the resistor element 142 is a capacitor 143 and leading from the opposite end of the resistor element 142 is a conductor 144 leading to a movable arm 145 of a potentiometer 146. The potentiometer arm 145 cooperates with a variable resistor element 147 having one end thereof connected by a conductor 148 to the common electrical ground.

The opposite end of the resistor element 147 is connected by a conductor 150 to the terminal 88 and resistor 91, through resistor 91 to conductor 150 and through thermistor bead 82 and the terminal 90 to conductor 150 which is in turn connected through a conductor 152 to the conductor 134 leading from the negative terminal of the battery 136.

Thus, upon the reed switch 108 closing the contact 110 the battery 136 applies a voltage through the resistor 142 under the control of the potentiometer 146, resistor 91 and thermistor bead 82. The voltage applied through the resistor 142 is in turn applied to the input of the amplifier 115 through the chopper 104.

The pulsating control voltage effected through the chopper 104 by the reed switch 108 in opening and closing contacts 102 and 110 in synchronism with the alternating excitation current is in turn applied by the amplifier 115 across output lines 146 leading to a control winding 147 of a servomotor 149. The servomotor 149 may be of a conventional two-phase type having a fixed phase winding 151 connected by conductors 153 to the aforenoted suitable source of alternating current, while the control winding 147 effects rotation of the servomotor 149 in a direction dependent upon the sense of the differential voltage applied to the contact element 102. The servomotor 149 is drivingly connected through a reduction gearing 155 and a shaft 157 to the indicator pointer 78 adjustably positioned to cooperate with the altitude indicia dial 77, as heretofore explained.

The indicator pointer 78 is in turn connected through a follow-up shaft 159 to the movable potentiometer arm 126 of the altitude follow-up control potentiometer 128 and through a shaft 160 to the movable potentiometer arm 145 so that the same are driven in synchronism therewith.

The indicator shaft 157 driven by the servomotor 149 is drivingly connected to the shafts 159 and 160 to thereby adjust the altitude follow-up control potentiometer 128 so as to null the output signal from the sensor 5, as explained in the aforenoted U.S. application Serial No. 693,-323 and shown schematically in FIGURE 5 and applied to the contact element 102 while effecting through adjustment of the control potentiometer 146 a similar adjustment of the negative supply of electrical energy applied therethrough to the contact element 110.

In addition, the servomotor 149 drives through a shaft 161 a rate generator 162 of a conventional type having an exciting winding 164 connected through conductors 166 to the suitable source of alternating current and an output winding 168 connected at 170 to the common ground, a conductor 172, resistor element 174 and conductor 176 to the amplifier 115 and in turn through a variable resistor element 178, adjustable resistor arm 180 and conductor 182 to the common ground. The variable resistor arm 180 is in turn mechanically connected through a shaft 184 to the shaft 157 driven through the reduction gearing 155 by the servomotor 149 so that as described and claimed in the copending U.S. application Serial No. 12,297 filed March 2, 1960 by Edward A. Chilton and assigned to Bendix Aviation Corporation, now by change of name The Bendix Corporation, assignee of the present invention, the value of the resistor 178 serves to vary both the gain of the amplifier 115 and a rate signal voltage derived from the rate signal generator 162 driven by the servomotor 149.

Thus, as explained in the aforenoted U.S. application Serial No. 12,297 of Edward A. Chilton, the effect of the foregoing arrangement is to provide higher gain in the amplifier 115 with little damping for low voltage signals per unit of change in the measured altitude condition at relatively high altitudes while also providing a low gain in the amplifier 115 with a larger degree of damping for high voltage signals per unit of change in such measured altitude condition encountered at relatively low altitudes, as shown graphically and explained in greater detail in the aforenoted U.S. application Serial No. 12,297 of Edward A. Chilton.

The thermistor bead 82, as shown schematically in FIGURE 5, is so arranged as to compensate for the initial warm-up or transient condition of the oven 7. Air entering from the conduit 80 is baffled by the member 56 so that it must pass through the interstice 59 formed by the casing 34 and member 56, thus being brought into close thermal equilibrium with the casing 34, before entering the system of concentric cylinders therein where it is subjected to ionizing radiation. The sensor is "dead-ended," or simply "breathes" the atmosphere to be measured; and is not subjected to appreciable gas flow.

Further, as shown in FIGURE 5, for any pressure sensed, the output current of the sensors will develop a voltage across input resistor 119. The follow-up potentiometer resistor 130 is very much lower in resistance than the input resistor 119, and therefore only about one-thousandth of the voltage developed by the output current flowing through 119 and 130 in series is developed across 130 at the maximum position of the potentiometer arm 126 relative to the resistor 130. The input resistance of the electrometer of amplifier 115, however, is somewhat higher than the value of resistor 119 so that negligible current is drawn thereby. The voltage which appears on terminal 102 of the chopper 104 is, therefore the difference between the voltage drop developed across resistor elements 119 and 130 as a result of the sensor 5 output current and the voltage present at the wiper arm 126 of follow-up potentiometer 128 as a result of the negative supply provided by battery 136. The arm 126 of the potentiometer 128 is initially at a maximum voltage sea level position and is subsequently modified by the adjustment of the arm 126 relative to resistor element 130 with increase in the altitude indicated by pointer 78 toward the minimum voltage position.

When the ion concentration within the sensor changes as a result of a change in pressure, the output current causes a voltage change across resistors 119 and 130. Since chopper terminal 110 is maintained essentially at a voltage in initial operation, as heretofore explained, and subsequently modified by the adjustment of the potentiometer arm 145 relative to resistor element 147 with increase in the altitude indicated by pointer 78, it will be seen that the chopper will produce an A.C. control signal, detected by the electrometer and subsequently amplified by the amplifier 115 and supplied to the servomotor 149. The motor 149 then drives potentiometer arm 126 to a point where the voltage present from the wiper terminal 126 to ground indicated as E–2 exactly equals the voltage across resistor 119, but of opposite polarity and indicated as E–3, the voltage produced by the output current. With negligible current drawn by the input circuit, the value of the input voltage to the amplifier 115 indicated as E–1 is reduced to zero when E–2=E–3. The chopper 104 in the initial operation then sees no difference between the two terminals 102 and 110 and the system is at null, while in subsequent operation the voltage applied to the contact elements 102 and 110 will be equal upon the null condition being reached.

Resistor 142 is made numerically equal to resistor 119 to prevent transient currents from unbalancing the null. Capacitor 121 helps bypass short duration noise peaks present in the sensor under certain conditions of high ion concentration. Capacitor 143 maintains the time constant of the reference terminal equal to that of the signal terminal. Resistors 113 and 116 "lock" the input to the electrometer 115 in the interval when the chopper 104 is in transit from terminal 102 to 110.

Since the sensor output terminal 102 is always maintained at zero potential by the action of the servo, the voltage drop across the sensor 5 remains constant despite variations in output current.

The reference terminal 110 of the chopper 104 is at a voltage determined by the temperature compensating system including the resistor 142, resistor 91, potentiometer 146 and bead 82. The voltage thereby applied approaches a maximum value at sea level and decreases with increasing indicated altitude. Moreover, in order to minimize the effect of thermal transients during warm-up or sudden changes in ambient temperatures about the oven, the resistor 142, resistor 91 and thermistor bead 82 are connected as shown to potentiometer 146, which then supplies an incremental voltage proportional to the temperature of the sampled air and the altitude indicated by the pointer 78. The thermistor 82 senses the sampled air temperature within the sensor 5, and potentiometer resistor 147 has a resistance slope corresponding to the pressure-altitude relationship.

*Operation*

In the subsequent operation of the temperature compensating means from the initial condition so long as the temperature of the sampled atmospheric air within the sensor 5 is maintained at the predetermined constant value or for example 100° C. and upon the pressure of the sampled air being at a value corresponding to the altitude indicated by the adjusted position of the pointer 78, the differential voltage applied to the contact element 102 will be at a value corresponding to that of the reference voltage applied to the contact element 110 of the chopper 104 so that the chopper 104 in effect supplies a null signal to the electrometer and amplifier 115 and thereby the control winding 147 of the servomotor 149 so that rotation of the motor 149 is not effected.

However, upon an increase in the atmospheric pressure of the sampled air in the sensor 5, as upon a decrease in altitude of the aircraft, the differential voltage applied to the contact element 102 will be of a value different from that of the reference voltage applied to the contact element 110 whereupon the A.C. control signal effected by the chopper 104 and applied through the electrometer and amplifier 115 to the control winding 147 will be of such a phase relative to that of the excitation of the fixed phase winding 151 as to cause rotation of the servomotor 149 in a direction to cause the indicator pointer 78 to be adjusted in a direction to indicate on the indicia 77 a decrease in the indicated altitude corresponding to the prevailing pressure of the sampled atmospheric air. The motor 149 will simultaneously adjust the arm 126 relative to resistor 130 and arm 145 relative to resistor 147 so as to vary both the differential voltage applied to the contact element 102 and the reference voltage applied to the contact element 110 in such a sense as to cause the one voltage to be of a value equal to the other voltage so that the chopper 104 will in turn effect a null A.C. control signal causing the servomotor 149 to cease operation when the indicator pointer 78 has been adjusted to a position relative to the indicia 77 indicating an altitude corresponding to that of the prevailing atmospheric pressure sampled in the sensor 5.

Similarly, upon a decrease in the atmospheric pressure of the sampled air in the sensor 5 as upon an increase in the altitude of the aircraft, the chopper 104 will effect an A.C. control signal applied through the electrometer and amplifier 115 to the control winding 147 of an opposite phase to cause servomotor 149 to adjust the indicator pointer 78 to a position relative to the indicia 77 to indicate an increased indicated altitude corresponding to the prevailing pressure of the sampled atmospheric air, whereupon the follow-up adjustment of the arm 126 relative to the resistor 130 and the arm 145 relative to the resistor 147 will cause a variance in the differential voltage applied to the contact element 102 and the reference voltage applied to the contact element 110 in such a sense as to cause the one voltage to equal the other and in turn cause the chopper 104 to effect a null A.C. control signal to terminate the rotation of the servomotor 149.

However, upon the temperature of the atmospheric air sampled within the sensor 5 being of a value less than the predetermined constant value normally maintained by the oven 7 as during warm-up or upon sudden changes in the ambient temperature of the atmosphere about the oven 7, the density of the sampled air within the sensor 5 would tend to increase due to such variance in the temperature thereof from the reference value and in turn tend to cause the servomotor 149 to effect an erroneous adjustment of the pointer 78 in a low altitude sense.

The thermistor bead 82 in response to the low temperature of the sampled atmospheric air and having a negative temperature coefficient of resistance is thereupon effective to provide an increased series electrical resistance to that of the resistor 147 and to act in a sense to follow the change in the differential voltage applied to the contact element 102 due to increased density of the sampled air so that the reference voltage applied to the contact element 110 will in turn be so varied as to equal that applied at the contact element 102 and thereby tend to correct or prevent an erroneous adjustment of the altitude indicator pointer 78 due to change in the density of the sampled atmospheric air resulting from a decreased temperature below that of the reference temperature value to be maintained by the oven 7.

Similarly, a rise in the temperature of the sampled air above the reference temperature value causing the density of the sampled air to decrease and the servomotor 149 to effect an adjustment of the pointer 78 in a high altitude sense, will cause the resistance of the thermistor bead 82 to decrease and to act in a sense to follow the change in the differential voltage applied to the contact element 102 due to such decrease in density of the sampled air so that the reference voltage applied to the contact element 110 will in turn be so varied as to equal that applied at the contact element 102 and thereby tend to correct or prevent an erroneous adjustment of the altitude indicator pointer 78 due to change in the density of the sampled atmospheric air resulting from an increased temperature above that of the reference temperature value to be maintained by the oven 7.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In an air density sensor device of a type including a casing, spaced anode and cathode elements mounted within said casing for providing a sampling zone therebetween, means for supplying air under prevailing atmospheric pressure to within said casing and thereby to said sampling zone, means to ionize the air in the sampling zone, heating means to maintain the air in the sampling zone at a predetermined temperature value, and electrical means operatively connected to the anode and cathode elements so as to provide an output signal directly proportional to said atmospheric pressure; the improvement comprising temperature responsive means mounted within said casing, and means operatively connecting said temperature responsive means to said electrical means to compensate said output signal for changes in the density of the air in the sampling zone due to a variation in the temperature thereof from said predetermined temperature value.

2. The improvement defined by claim 1 including a source of electrical energy, an adjustable means to control the source of electrical energy, and electrical resistor means mounted within said casing and having a resistance variable with temperature, said resistor means being serially connected with said source and control means, and output lines leading from across the serially connected electrical resistor means, control means and source of electrical energy so as to provide a compensating voltage to correct said output signal for changes in the density of the air in the sampled zone due to a variation in the temperature thereof from said predetermined temperature value.

3. The improvement defined by claim 2 in which said control means includes a means responsive to changes in altitude to vary the correction of said output signal in accordance with a predetermined relationship between the temperature of the atmospheric air in the sampling zone and the prevailing altitude.

4. The improvement defined by claim 1 in which said temperature responsive means includes a thermistor bead of a carbon alloy having a negative temperature coefficient of resistance, means for mounting the thermistor bead within the casing and subject to the temperature of the air in the sampling zone, and means electrically connecting said thermistor bead so as to compensate the output signal for changes in the density of the air in the sampling zone due to a variation in the temperature thereof from said predetermined temperature value.

5. For use on an aircraft, a device for indicating the altitude of flight of said aircraft, said device being of a type including an air density sensor having a casing, spaced anode and cathode elements mounted within said casing for providing a sampling zone therebetween, conduit means for supplying air to said sampling zone under prevailing atmospheric pressure, an ionizing material on one of the elements to ionize the air in the sampling zone, a source of electrical energy and electrical resistor means serially connected between the anode and cathode elements, output lines leading from across the electrical resistor means to provide an output signal voltage directly proportional to the prevailing atmospheric pressure at the altitude of flight of the aircraft, and an altitude indicator means operatively connected to said output lines; the improvement comprising temperature responsive means mounted within said casing and sensitive to the temperature of the air within said sampling zone, another source of electrical energy, means to control said other source of electrical energy, means operably connecting said altitude indicator means to said control means, and means operatively connecting said temperature responsive means, control means and other source to said altitude indicator means to compensate the indicator means in accordance with a predetermined relationship between the temperature of the air in the sampling zone and the indicated altitude.

6. In a density sensor device of a type including spaced anode and cathode elements for providing a sampling zone therebetween, means for supplying a gaseous medium to said sampling zone at a variable pressure, means to ionize the gaseous medium in the sampling zone, heating means to maintain the gaseous medium in the sampling zone at a predetermined constant temperature, and means operatively connected with said anode and cathode elements to provide an output signal directly proportional to the prevailing pressure of said variable pressure gaseous medium; the improvement comprising means mounted within said casing and responsive to the temperature of the gaseous medium in the sampling zone to provide a second signal to compensate the first mentioned output signal for variations in the density of the gaseous medium in the sampling zone due to changes in the temperature thereof.

7. The improvement defined by claim 6 in which said temperature responsive means includes an element having a resistance variable with the temperature of the gaseous medium, and a source of electrical energy controlled by said element to provide a voltage to effect the compensation of said output signal.

8. In a device for ascertaining the pressure of a gaseous medium; said device being of a type including a casing, a pair of coaxial members positioned within said casing in spaced relation to provide a first electrode, another member extending between said pair of coaxial members in spaced relation thereto to provide a second electrode, said other member cooperating with said pair of coaxial members to provide sampling zones therebetween in which to sense the density of the gaseous medium and thereby ascertain the pressure thereof, one of said electrodes having surfaces bearing a radioactive material to effectively ionize the sampling zones, conduit means opening into said casing at one end thereof for applying a gaseous medium under a variable pressure within said casing, said casing having an inner surface spaced from said first and second electrodes so as to provide a passageway permitting movement of the gaseous medium at an opposite end of the casing into the sampling zones between said pair of coaxial members and said other member upon compression of the gaseous medium and said passageway permitting movement of the gaseous medium out of the sampling zones upon decompression of the gaseous medium during variations in the pressure of the gaseous medium applied within said casing; the improvement comprising a temperature responsive means mounted within said casing at said opposite end thereof to sense the temperature of the gaseous medium passing into and out of the sampling zones so as to compensate the ascertained pressure of the gaseous medium for changes in the density of the gaseous medium due to changes in the temperature thereof.

9. In a device for ascertaining the pressure of a gaseous medium, said device being of a type including a casing, a pair of coaxial members positioned within said casing in spaced relation to provide a first electrode, another member extending between said pair of coaxial members in spaced relation thereto to provide a second electrode, said other member cooperating with said pair of coaxial members to provide sampling zones therebetween in which to sense the density of the gaseous medium and thereby ascertain the pressure thereof, one of said electrodes having surfaces bearing a radioactive material to effectively ionize the sampling zones, conduit means opening into said casing at one end thereof for applying a gaseous medium under a variable pressure within said casing, said casing having an inner surface spaced from said first and second electrodes so as to provide a passageway for the gaseous medium opening at an opposite end of the casing into the sampling zones between said pair of coaxial members and said other member, heating means surrounding the casing, and thermostatic means responsive to the temperature of the heating means for controlling the heating means so as to regulate the temperature of the gaseous medium within said passageway and sampling zones to a predetermined temperature value; the improvement comprising an element having an electrical resistance variable with temperature, supporting means for mounting the element within the casing and in the opening of said passageway into said sampling zones so that said element is effective to sense the temperature of the gaseous medium passing into and out of the sampling zones, and means electrically connected with said element for providing a signal varying with the sensed temperature for compensating the ascertained pressure in accordance therewith.

10. In a device for ascertaining the pressure of a gaseous medium; said device being of a type including a casing, a pair of coaxial members positioned within said casing in spaced relation to provide a first electrode, another member extending between said pair of coaxial members in spaced relation thereto to provide a second electrode, said other member cooperating with said pair of coaxial members to provide sampling zones therebetween in which the sense the density of the gaseous medium and thereby ascertain the pressure thereof, one of said electrodes having surfaces bearing a radioactive material to effectively ionize the sampling zones, conduit means opening into said casing at one end thereof for applying a gaseous medium under a variable pressure within said casing, said casing having an inner surface spaced from said first and second electrodes so as to provide a passageway for the gaseous medium opening at an opposite end of the casing into the sampling zones between said pair of coaxial members and said other member, heating means including heater coils surrounding the casing, temperature responsive means for controlling energization of the heater coils so as to regulate the temperature of the gaseous medium within said passageway and sampling zones to a predetermined temperature value, and electrical means operatively connected between said electrodes for effecting an output signal directly proportional to the pressure of the gaseous medium; the improvement comprising a thermistor bead of a carbon alloy having a negative temperature coefficient of resistance, a pair of pins extending through the opposite end of the casing and supporting the thermistor bead therebetween, said thermistor bead being supported by the pins within the casing and in the opening of said passageway into said sampling zones, and means electrically connected to the thermistor bead through the pins to effect a voltage for compensating the aforenoted output signal in accordance with the temperature of the gaseous medium in the sampling zones.

11. For use with an altitude indicator system, an ion air density sensor device comprising a casing, spaced anode and cathode elements mounted in said casing for providing a sampling zone therebetween, means for supplying air under prevailing atmospheric pressure to within said casing and thereby to said sampling zone, means to ionize the air in the sampling zone, heating means to maintain the air in the sampling zone at a predetermined temperature value, and electrical means operatively connected to the anode and cathode elements so as to provide an output signal varying with the density of the air in the sampling zone and directly proportional to said atmospheric pressure for operating said altitude indicator system, temperature responsive means mounted within said casing for effecting a second output signal in accordance with the temperature of the air in the sampling zone for compensating said altitude indicator system for changes in the density of the air in the sampling zone due to variations in the temperature thereof from said predetermined value.

12. The combination defined by claim 11 including other means for controlling said second output signal, and means for operatively connecting the altitude indicator system to said other control means so that said second output signal may be effected in accordance with a predetermined relationship between the temperature of the air in the sampling zone and the indicated altitude.

13. In a control system; the combination comprising a chopper means, said chopper means including a pair of input means, an output means, and means for operatively connecting one and then the other of said pair of input means alternately to said output means, air pressure condition sensing means, means for applying air under prevailing atmospheric pressure to said air pressure conditioning sensing means, said air pressure condition sensing means for applying a first signal to one of said pair of input means in accordance with said sensed condition, temperature condition sensing means for sensing temperature of the air applied to said air pressure condition sensing means, said temperature condition sensing means for applying a second signal to the other of said pair of input means in accordance with said sensed temperature condition, and said alternate connecting means cooperating with said pair of input means so as to effect a control signal at said output means as a resultant of the first and second signals.

14. In a control system, the combination comprising an electrical chopper means, said chopper means including a first electrical input means, a second electrical input means, an electrical output means, and means for operatively connecting said first and second input means alternately to said output means, an ion air density sensitive means, means for applying air under prevailing atmospheric pressure to said air density sensitive means, said air density sensitive means for applying an electrical signal to said first input means in accordance with the density of said applied air, temperature responsive means sensitive to the temperature of said applied air for effecting an electrical signal to said second input means varying with said temperature, and said alternate connecting means cooperating with said pair of input means so as to effect an electrical control signal at said output means as a resultant of the density and temperature signals applied to said first and second input means.

15. In a control system, the combination comprising an electrical chopper means, said chopper means including a first electrical input means, a second electrical input means, an electrical output means, and means for operatively connecting said first and second input means alternately to said output means, an ion air density sensitive means, means for applying air under prevailing atmospheric pressure to said air density sensitive means, said air density sensitive means for applying an electrical signal to said first input means in accordance with the density of said applied air, temperature responsive means sensitive to the temperature of said applied air, an adjustable control means jointly cooperating with said temperature responsive means for applying an electrical signal to said second input means, a follow-up means adjustably positioned to vary the electrical signal applied to said first input means, said alternate connecting means cooperating with said pair of input means so as to effect an electrical output signal at said output means as a resultant of the signals applied to said first and second input means, and reversible motor means controlled by said resultant output signal to adjustably position said control means and follow-up means in a sense to null the resultant electrical output control signal.

16. In a control system; the combination comprising a chopper means, said chopper means including a pair of input means, an output means, and means for alternately connecting said output means to one and then the other of said pair of input means, means for sensing an atmospheric condition, said atmospheric condition sensing means for applying a signal to one of said pair of input means in accordance with said sensed condition, means for sensing another atmospheric condition, said other atmospheric condition sensing means for applying a signal to another of said pair of input means in accordance with said other atmospheric condition, and said alternate connecting means cooperating with said pair of input means so as to effect a control signal at said output means as a resultant of the signals applied at said pair of input means.

References Cited in the file of this patent
UNITED STATES PATENTS

| | | |
|---|---|---|
| 2,459,730 | Williams | Jan. 18, 1949 |
| 2,622,192 | Tarpley | Dec. 16, 1952 |
| 2,697,191 | Wannamaker et al. | Dec. 14, 1954 |
| 2,908,819 | Marx | Oct. 13, 1959 |
| 2,954,474 | Lawrance | Sept. 27, 1960 |

UNITED STATES PATENT OFFICE
CERTIFICATE OF CORRECTION

Patent No. 3,044,012            July 10, 1962

George V. Zito et al.

It is hereby certified that error appears in the above numbered patent requiring correction and that the said Letters Patent should read as corrected below.

Column 2, line 11, for "These" read -- There --; column 12, line 39, for "in which the" read -- in which to --.

Signed and sealed this 20th day of November 1962.

(SEAL)
Attest:

ERNEST W. SWIDER
Attesting Officer

DAVID L. LADD
Commissioner of Patents